May 8, 1956  A. J. GERBER  2,744,340
FOOTWEAR AND METHODS OF MAKING THE SAME
Filed April 17, 1953  2 Sheets-Sheet 1

INVENTOR
ALBERT J. GERBER
BY Alfred W. Petchaft
ATTORNEY

May 8, 1956 A. J. GERBER 2,744,340
FOOTWEAR AND METHODS OF MAKING THE SAME

Filed April 17, 1953 2 Sheets-Sheet 2

INVENTOR
ALBERT J. GERBER
BY
ATTORNEY

United States Patent Office 2,744,340
Patented May 8, 1956

2,744,340

FOOTWEAR AND METHODS OF MAKING THE SAME

Albert J. Gerber, Ladue, Mo., assignor to Gerber Plastic Company, St. Louis, Mo., a corporation of Missouri Application April 17, 1953, Serial No. 349,360

8 Claims. (Cl. 36—11.5)

This invention relates to certain new and useful improvements in sponge soled footwear and methods of making the same.

It is the primary object of the present invention to provide a new and unique type of footwear and, more particularly, a sandal, the sole element of which is molded as a single and entire unit from a synthetic plastomer and is of interior porous sponge-like structure with an integrally formed external skin or wearing surface which is extremely tough and possesses an unusually high degree of abrasion resistance.

It is a further object of the present invention to provide means and methods of making footwear of the type stated which means and methods are extremely efficient, labor-saving, and economical so that highly attractive and long-wearing footwear may be produced at comparatively low cost.

With the above and other objects in view, my invention resides in the novel features of form, construction, arrangement, and combination of parts presently described and pointed out in the claims.

In the accompanying drawings (two sheets)—

Figure 1:
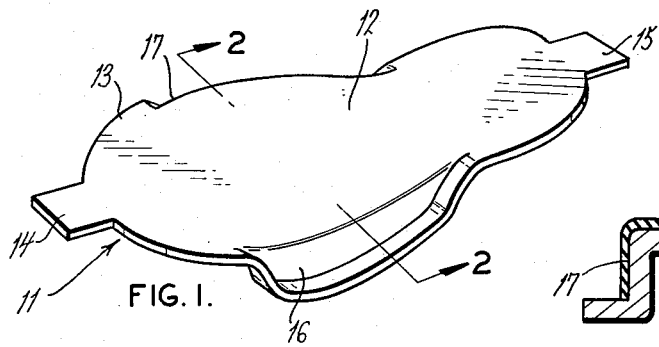
Figure 1 is a perspective view of a mold cover forming a part of the present invention.
Figure 2:
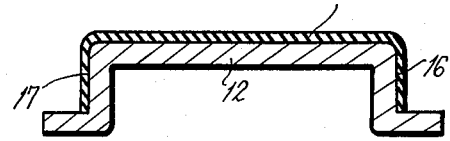
Figure 2 is a transverse sectional view taken along line 2—2 of Figure 1.

Referring now in more detail and by reference characters to the drawings, which illustrate practical embodiments of the present invention, 1 designates a hollow metallic mold integrally including a bottom plate 2, an upstanding peripheral side-wall forming flange 3 provided at its opposite ends with horizontally projecting handling tabs 4, 5, all arranged to form a mold-cavity c, which has the general contour of a sandal-sole. The interior faces of the mold-cavity c are preferably polished to present highly smooth surfaces from which the formed sandal-sole may be readily stripped as will be presently more fully described. In this connection, however, it should be noted that the surface of the bottom plate 2 may be engraved to form a tread of any desired pattern and the side faces of the mold may be similarly engraved to impart a pebble grained appearance or any other surface configuration to the finished product.

Figure 3:
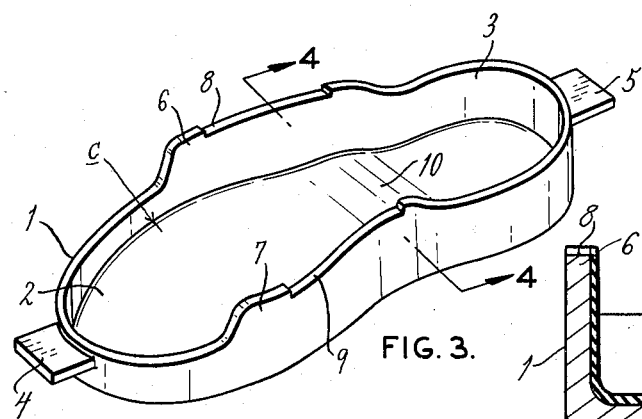
Figure 3 is a perspective view of a mold forming a part of the present invention.
Figure 4:
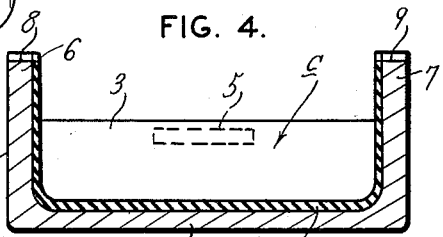
Figure 4 is a transverse sectional view taken along line 4—4 of Figure 3.
Figure 6:
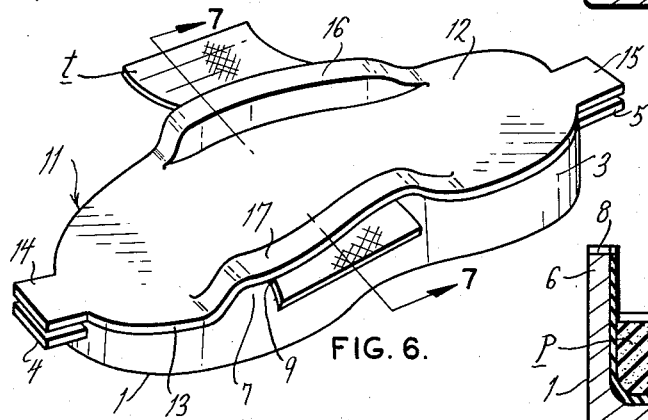
Figure 6 is a perspective view of the mold and cover in assembled relation preparatory to polymerization of the raw material.
Figure 5:
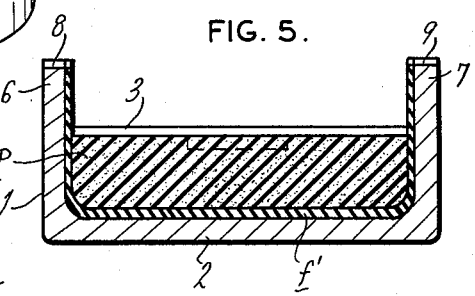
Figure 5 is a sectional view similar to Figure 4 showing the mold filled with a raw material from which the sole-forming element of the present invention is molded.
Figure 7:
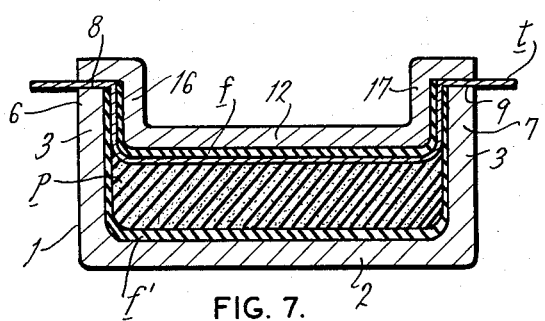
Figure 7 is a transverse sectional view taken along line 7—7 of Figure 6.

As will be seen by reference to Figure 3, the peripheral side-wall forming flange 3 is contoured along its upper margin to provide shank-flap forming elements 6, 7, having shallow marginal top recesses 8, 9, respectively. It will also be noted by reference to Figure 3 that the interior surface of the bottom plate 2 is provided with an upwardly projecting ridge 10 in the region of the shank of the shoe for the purpose of imparting shank clearance between the sole and heel portions of the sole-forming element when the latter is molded therein.

Provided for co-operation with the mold 1 is a mold cover 11 integrally including a top plate 12 and a continuous marginal flange or rim 13 for overlying engagement upon the upper peripheral surface of the flange 3. At its forward and rearward ends, the cover plate 11 is provided with handling tabs 14, 15, which are adapted to overlie and register with the handling tabs 4, 5. In the region of its shank, the rim or flange 13 is deformed outwardly in the provision of shank-flap forming recesses 16, 17, respectively, contoured for interfitting disposition within and in spaced relation to the shank-flap forming elements 6, 7. The mold 1 and mold cover 11 are formed for snug-fitting inner engagement so that the mold-cavity c will be entirely enclosed when the mold is in actual use except for the recesses 8, 9, which serve a purpose presently to be more fully discussed. The inwardly presented face of the top plate 12 which forms the top surface of the mold-cavity c is smoothly polished so that the sole-forming element, when finished, will present a smooth, comfortable surface against the foot of the wearer.

In manufacturing a sandal in accordance with the methods of the present invention, the interior or cavity forming faces of the mold 1 and cover plate 11 are sprayed with a vinyl plastisol, that is to say a viscous liquid consisting of an unpolymerized heat setting vinyl polymer or polymers, plasticizers, vehicles and pigment. If necessary, suitable catalysts and accelerators may be incorporated in the plastisol mixture. By this method, plastisol films $f$, $f'$, of substantial thickness and density, are formed directly upon the interior surfaces of the mold-cavity c. In so doing, care should be observed to avoid coating the face of the rim or flange 13 and the upper peripheral or marginal edges of the flap 3, or, if such surfaces become coated, they should be wiped clean so that when the mold 1 and mold cover 11 are put together they will fit smoothly and tightly.

After the film $f$ has been applied to the mold cover 11 and preferably while it is still slightly tacky, a strip of fabric tape $t$ is laid thereacross so that it will fit tightly within the recesses 8, 9, and extend with free or loose ends therebeyond when the cover plate 11 is in place. This fabric tape should preferably be impregnated with a suitable material rendering it compatible with, and bondable to, the plastisol which is used to form the film $f$. Preferably this can be accomplished by impregnating the tape with the same vinyl plastisol mixture employed to form the films $f$, $f'$, and heating the impregnated tape for a limited time and to a limited extent sufficient only to partially polymerize or set the plastisol so that when the tape is incorporated in the mold and subjected to polymerizing conditions during the polymerization cycle, as hereinafter described, the partially polymerized impregnant will become completely polymerized and integrally bonded to the film $f$.

The mold 1 is, thereupon, filled almost to its top level with a mass *p* of the same plastisol, which has, however, been foamed by agitation within a closed cylinder under high gas pressure and then released. In preparing and forming the foam, any conventional method and apparatus may be used and they do not specifically form a part of the present invention. In filling the mold, care should be observed to allow only a slight amount of room within the mold for thermal expansion so that the foam plastisol will, through the polymerization cycle, bond itself firmly and integrally to the films *f*, *f'*, and tape *t*.

Figure 8:
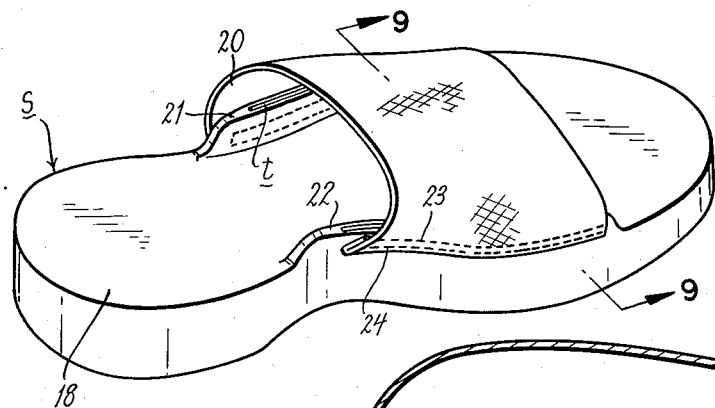
Figure 8 is a perspective view of a finished sandal constructed in accordance with and embodying the present invention.
Figure 9:
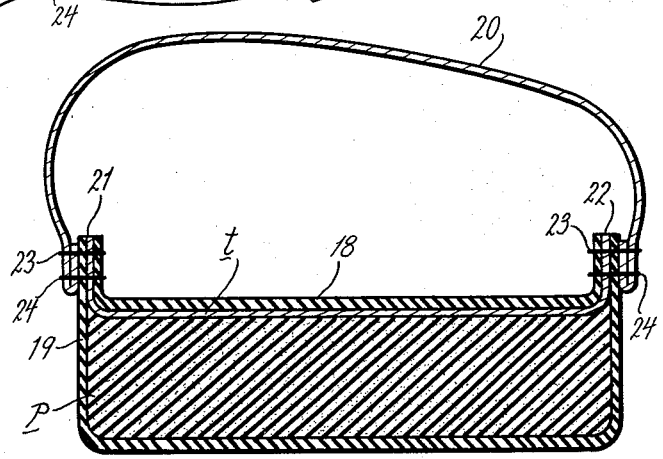
Figure 9 is a transverse sectional view taken along line 9—9 of Figure 8.

When the mold 1 has been properly filled, the cover plate 11, with the tape *t* in position, is applied to the mold 1 to form a tight closure therefor. When the mold is closed, the free ends of the tape will project outwardly through the recesses 8, 9, and will be slightly compressed into the recesses 8, 9, as the cover plate 11 is pressed into tightly seated position. Thus, the outwardly projecting ends of the tape *t* will, in effect, form a closure or seal for the recesses 8, 9. The closed mold is clamped together in any suitable or conventional manner and passed through an oven where it is brought up to, and held at, a predetermined temperature for a selected period of time during which the foam plastisol within the mold expands slightly, bonds itself to the films *f*, *f'*, and tape *t*, and both the foam plastisol and films *f*, *f'*, polymerize irreversibly to form a sponge-like sole-forming element 18 which is integrally encased in a tough, thick, durable external film or skin 19. After removal from the oven and cooling, the mold cover 11 may be removed from the mold 1 and the finished sole-forming element 18 stripped out of the mold. The excess or free ends of the tape *t* are then trimmed off with a scissors, knife, or in any other suitable manner, and an instep covering strap 20, preferably formed of heavy elastic or canvas strapping, is marginally folded under and stitched to upstanding shank-flaps 21, 22, by double rows of stitches 23, 24, to form a finished sandal S, as shown in Figures 8 and 9.

Figure 10:
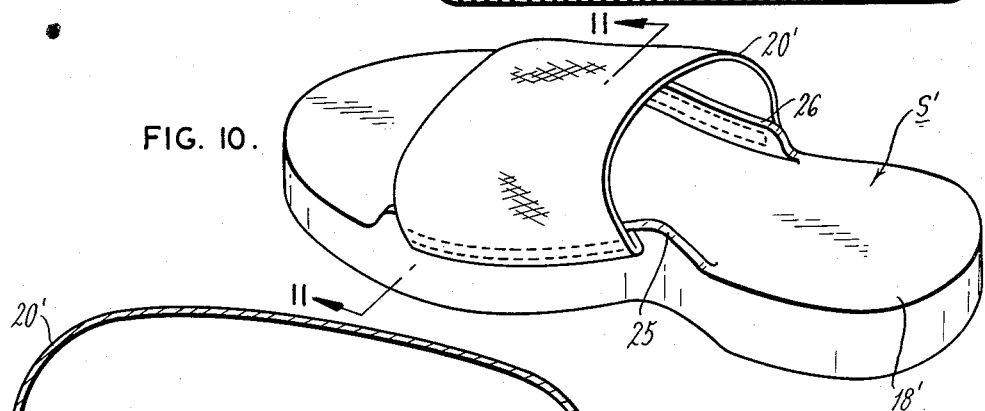
Figure 10 is a perspective view of a modified form of sandal constructed in accordance with and embodying the present invention.
Figure 11:
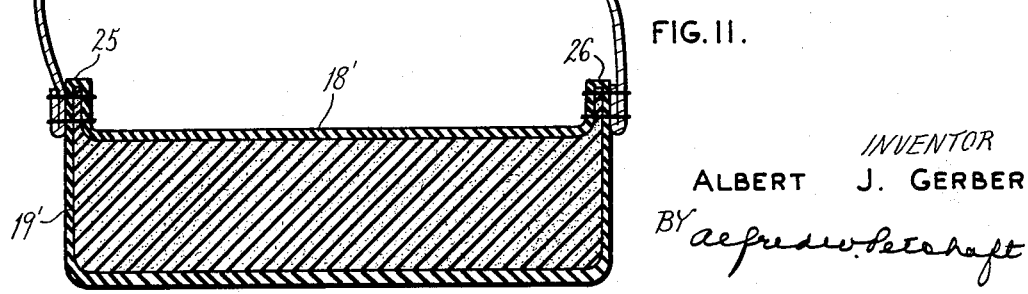
Figure 11 is a transverse sectional view taken along line 11—11 of Figure 10.

If desired, I may provide a modified form of sandal S' which includes a sole-forming element 18', substantially similar in all respects and formed by the same methods as previously described in connection with the sole-forming element 18 except that the tape *t* is omitted. This sole-forming element 18', therefore, has shank-forming flaps 25, 26, which are composed entirely of polymerized vinyl material and the sole-forming element 18' is, furthermore, formed with an external skin 19' which is continuous and unbroken even across the top of the shank-flaps 25, 26. An instep strap 20', substantially identical with the previously described instep strap 20, is stitched to the shank-flaps 25, 26, all as best seen in Figures 10 and 11.

It should be understood that changes and modifications in the form, construction, arrangement, and combination of the several parts of the footwear and in the steps of its production may be made and substituted for those herein shown and described without departing from the nature and principle of my invention.

Having thus described my invention, what I claim and desire to secure by Letters Patent is:

1. The method of making footwear which comprises providing a two-part mold which when closed provides a cavity adapted to form a sole-element of substantial thickness, coating the interior surfaces of the mold cavity with a film of a heat curable resin, providing a section of fabric tape treated to provide a surface coating of a substance capable of creating a bond with the resin, inserting a piece of the treated tape into the mold in facewise contiguity to one of the coated mold-faces, filling the mold cavity with an already foamed heat curing resin, subjecting the mold to heat whereby to cure the resin to form a sole-element having the tape integrally bonded to the film on said coated mold-face, and removing the sole-element from the mold.

2. The method of making footwear which comprises providing a two-part mold which when closed provides a cavity adapted to form a sole-element of substantial thickness, coating the interior surfaces of the mold cavity with a film of a heat curable resin, providing a section of fabric tape treated to provide a surface coating of a substance capable of creating a bond with the resin, inserting a piece of the treated tape into the mold across the region of the shank of the sole-forming element in facewise contiguity with one of the coated mold-faces and with its ends protruding from the mold on either side of the mold, filling the mold cavity with a heat curable self-sustaining resin foam, subjecting the mold to heat whereby to cure the resin to form a sole-element, and removing the sole-element from the mold.

3. The method of making footwear which comprises providing a two-part mold which when closed provides a cavity adapted to form a sole-element of substantial thickness, coating the interior surfaces of the mold cavity with a film of a heat curable resin, providing a section of fabric tape treated to provide a surface coating of a substance capable of creating a bond with the resin, inserting a piece of the treated tape into the mold across the region of the shank of the sole-forming element in facewise contiguity with one of the coated mold-faces and with its ends protruding from the mold on either side of the mold, filling the mold cavity with a heat curable self-sustaining resin foam, subjecting the mold to heat whereby to cure the resin to form a sole-element, removing the sole-element from the mold, and trimming off the protruding uncovered portions of the tape.

4. An article of footwear of the sandal type comprising a sole-element integrally including a relatively thick sponge-like interior body of synthetic polymerized resin, said body being entirely encased and enclosed in an integument of the same chemical constituency as the sponge-like body and having upstanding integral ears on opposite sides of the periphery thereof in the region of the shank, a piece of fabric tape impregnated with the same resin and embedded within the sole-element across the shank, said tape having one face fused directly to the integument and its ends encased within said ears, and a tape-like instep covering band rigidly secured at its opposite ends respectively to said ears.

5. An article of footwear of the sandal type comprising a sole-element integrally including a relatively thick sponge-like interior body of a polymerized vinyl resin, said body being entirely encased and enclosed in an integument of the same chemical constituency as the sponge-like body and having upstanding integral ears on opposite sides of the periphery thereof in the region of the shank, a piece of fabric tape impregnated with the same resin and embedded within the sole-element across the shank, said tape having one face fused directly to the integument and its ends encased within said ears, and a tape-like instep covering band rigidly secured at its opposite ends respectively to said ears.

6. An article of footwear of the sandal type comprising a sole-element integrally including a relatively thick sponge-like interior body entirely encased and enclosed in an integument and having upstanding integral ears on opposite sides of the periphery thereof in the region of the shank, a tape-like section of fabric embedded within said sole-forming member and extending transversely thereacross in the region of the shank with its ends extending upwardly and being embedded and enveloped within said ears, and a tape-like instep covering band rigidly secured at its opposite ends respectively to said ears by stitches extending through the ears and through the tape-like fabric embedded therein.

7. An article of footwear of the sandal type comprising a sole-element integrally including a relatively thick sponge-like interior body entirely encased and enclosed in an integument and having upstanding integral ears on opposite sides of the periphery thereof in the region of the shank, a tape-like section of fabric embedded within said sole-forming member and extending transversely thereacross in the region of the shank in facewise abutment directly against the interior portion of the integument with its ends extending upwardly and being embedded and enveloped within said ears, and a tape-like instep covering band rigidly secured at its opposite ends respectively to said ears by stitches extending through the ears and through the tape-like fabric embedded therein.

8. An article of footwear of the sandal type comprising a sole-element integrally including a relatively thick sponge-like interior body entirely encased and enclosed in an integument and having upstanding integral ears on opposite sides of the periphery thereof in the region of the shank, a tape-like section of fabric impregnated with a resin-compatible substance and being embedded within said sole-forming member and extending transversely thereacross in the region of the shank with its ends extending upwardly and being embedded and enveloped within said ears, and a tape-like instep covering band rigidly secured at its opposite ends respectively to said ears by stitches extending through the ears and through the tape-like fabric embedded therein.

References Cited in the file of this patent
UNITED STATES PATENTS

| | | |
|---|---|---|
| 900,881 | Parker | Oct. 13, 1908 |
| 1,400,143 | Dial | Dec. 13 1921 |
| 1,622,860 | Cutler | Mar. 29, 1927 |
| 1,823,445 | Goldstone | Sept. 15, 1931 |
| 2,156,508 | Minor | May 2, 1939 |
| 2,247,337 | Raflovich | June 24, 1941 |
| 2,290,622 | Carter | July 21, 1942 |
| 2,394,327 | Niessen | Feb. 5, 1946 |
| 2,574,582 | Rollman | Nov. 13, 1951 |

FOREIGN PATENTS

| | | |
|---|---|---|
| 740,571 | France | Nov. 21, 1932 |